United States Patent [19]

Everson et al.

[11] 4,182,262
[45] Jan. 8, 1980

[54] APPARATUS FOR IMPREGNATING A TUBE

[75] Inventors: Benjamin A. Everson; Kenneth D. Klotzbier, both of Fresno, Calif.

[73] Assignee: Underground Surveys Corporation, Fresno, Calif.

[21] Appl. No.: 922,084

[22] Filed: Jul. 5, 1978

[51] Int. Cl.² .......................... B05C 7/04; B05C 13/00
[52] U.S. Cl. ........................................ 118/44; 118/50; 118/408; 156/294; 427/238; 427/294
[58] Field of Search ............... 427/230, 235, 238, 359, 427/365, 366; 156/294, 285, 286; 264/269, 134, 512, 553, 558; 118/32, 33, 407, 408, DIG. 10, DIG. 11, 44, 50, DIG. 12, DIG. 13, 116–119, 123–124, 126, 50.1

[56] References Cited

U.S. PATENT DOCUMENTS

| | | | |
|---|---|---|---|
| 1,199,314 | 9/1916 | Subers | 118/50 X |
| 1,931,570 | 10/1933 | Brown et al. | 156/312 X |
| 2,057,167 | 10/1936 | Sherman | 156/312 X |
| 2,794,758 | 6/1957 | Harper et al. | 156/294 X |
| 3,494,813 | 2/1970 | Lawrence et al. | 156/294 X |
| 3,974,306 | 10/1976 | Inamora et al. | 427/238 X |
| 4,009,063 | 2/1977 | Wood | 156/71 |
| 4,064,211 | 12/1977 | Wood | 264/95 |
| 4,135,958 | 1/1979 | Wood | 156/294 X |

FOREIGN PATENT DOCUMENTS

| | | | |
|---|---|---|---|
| 547820 | 1/1942 | United Kingdom | 427/238 |
| 1044645 | 10/1966 | United Kingdom | 427/238 |

*Primary Examiner*—Morris Kaplan
*Attorney, Agent, or Firm*—Huebner & Worrel

[57] ABSTRACT

A method and apparatus for impregnating a tube of absorbent material in which a mass of flowable material to be absorbed is inserted into the tube by a supply conduit, a vacuum is applied to the tube in spaced relation to the inserted material by a suitable source of vacuum, a flattening device is provided to compress the tube, and the tube is transported by an elongated conveyor through the flattening device commencing at the absorbent material and progressing toward the vacuum to spread the material from side to side of the tube and to extrude the material along the tube.

4 Claims, 7 Drawing Figures

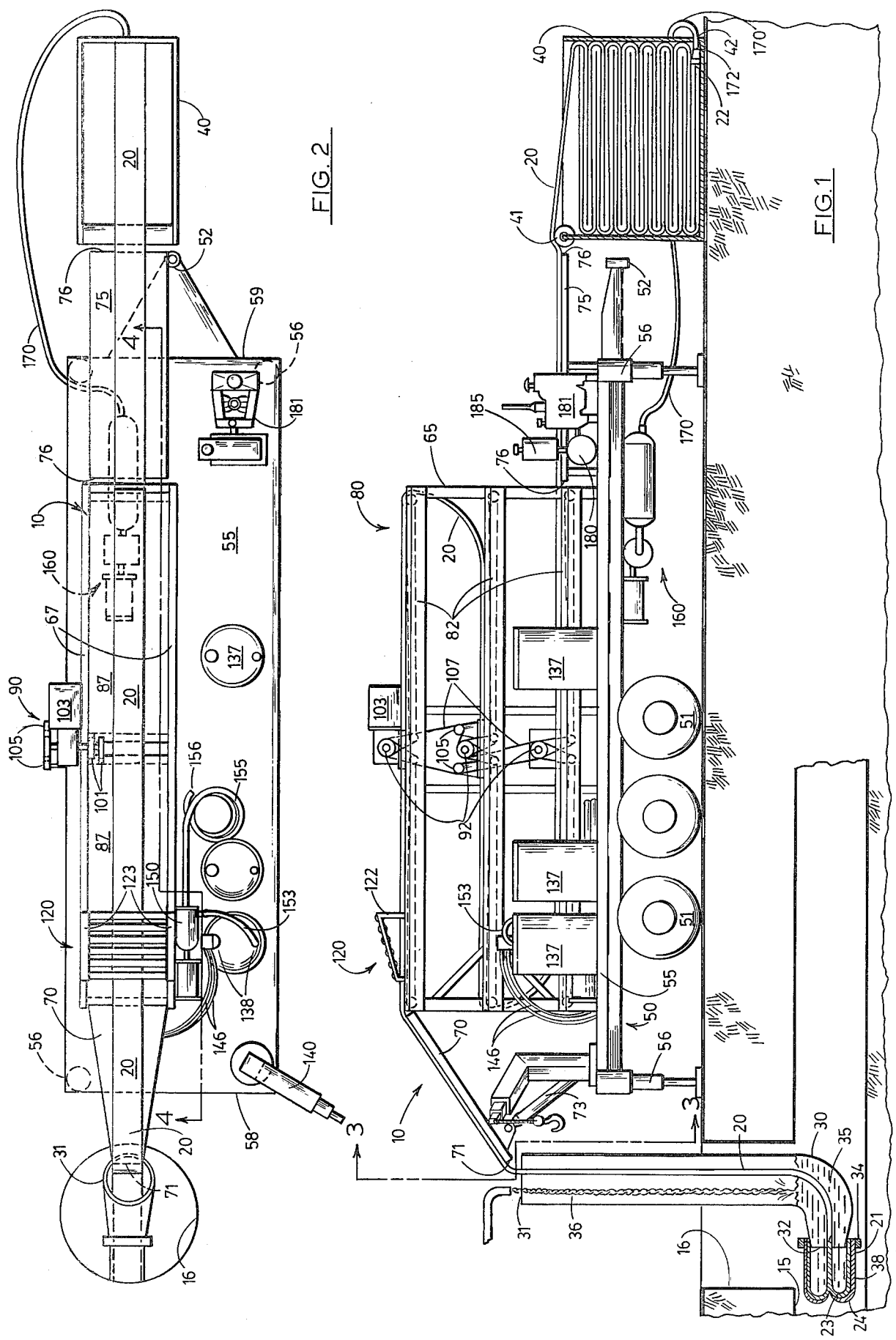

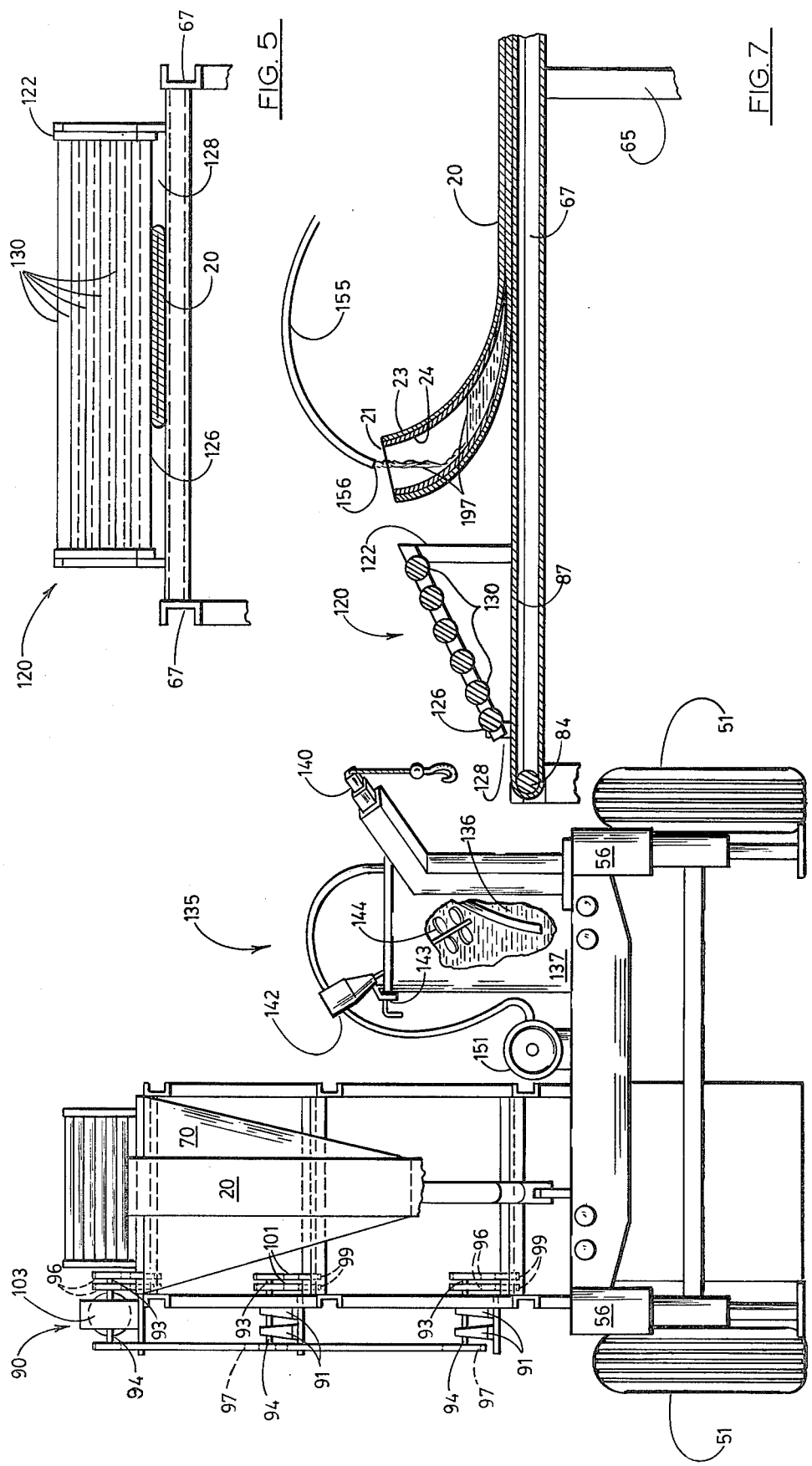

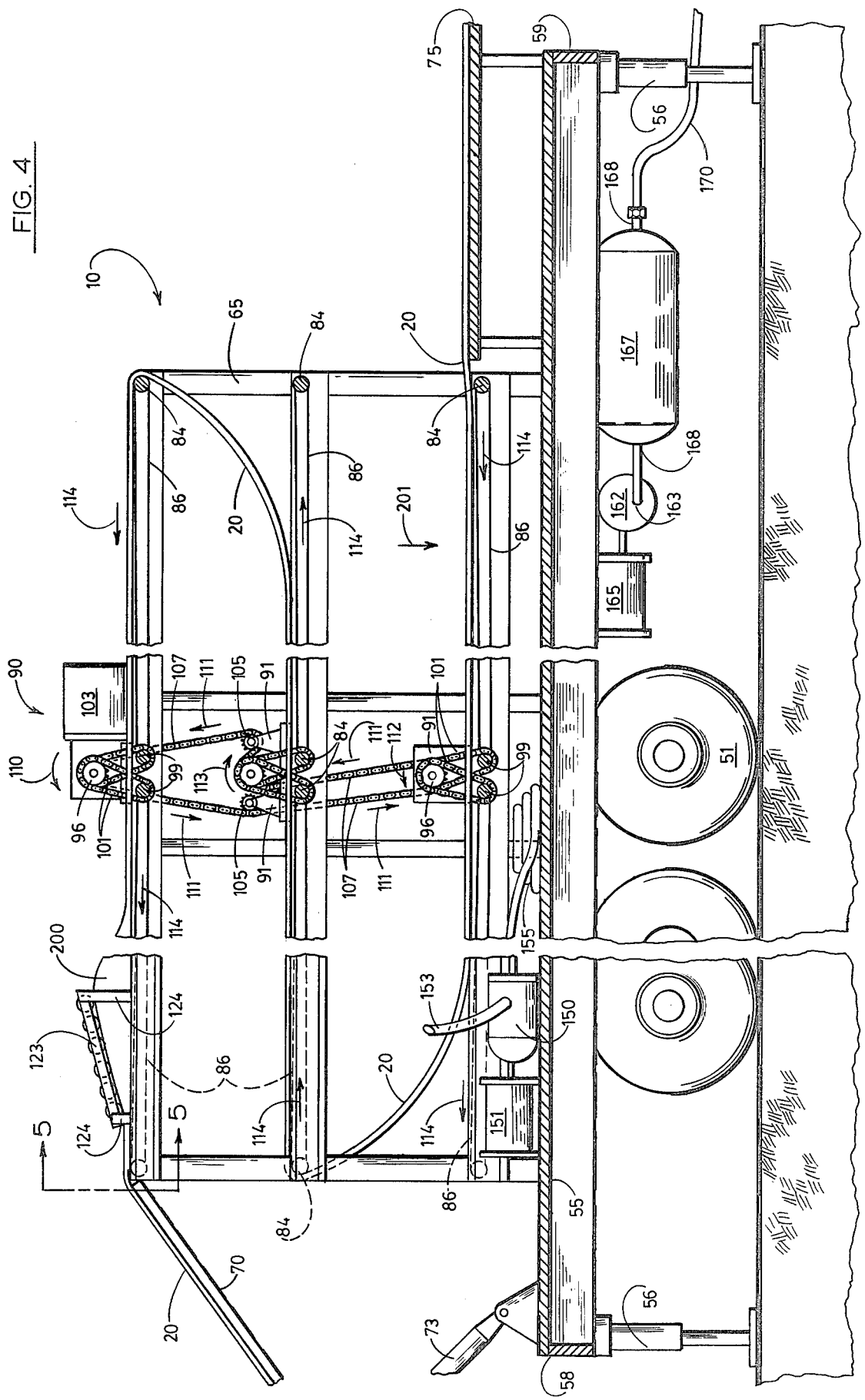

4,182,262

APPARATUS FOR IMPREGNATING A TUBE

BACKGROUND OF THE INVENTION

1. Field of the Invention

The present invention relates to an apparatus for impregnating a tube of absorbent material with a flowable material, and more particularly to such a method and apparatus having particular utility in impregnating a porous lamina of such a tube for lining passageways with a subsequently hardening material, the tube being inserted into the passageway after such impregnation, expanded to engage the walls thereof and hardened to form a rigid shell therein.

2. Description of the Prior Art

Methods for lining passageways with a tube having an inner lamina impregnated with a subsequently hardened material are well known and are described in the patents cited in the "Prior Art Statement" below. These methods employ a prefabricated tube and a resin which hardens in a relatively short time at ambient temperature. It the tube is impregnated with the resin when it is formed, it must be refrigerated during storage and shipment to prevent hardening of the resin before the tube is inserted into a passageway which is to be lined. Such refrigeration is relatively inconvenient and expensive, especially when the tube is to be used at a relatively great distance from the location where it is fabricated.

Such refrigeration can be eliminated by impregnating a prefabricated tube at the site of passageway to be lined. In one prior art method for such impregnation, repeated perforations are made along the tube as it is inserted into the passageway for access to the layer to be impregnated. A relatively small portion of the resin required is inserted through each perforation. After each insertion, a patch is applied to the tube over the corresponding perforation. Another method incorporates resin conduits in the tube which extend longitudinally within said layer. This method involves the additional expense of incorporating these conduits and supplying them from a pressurized source of resin. Still another method, which can be used when said layer is disposed interiorly of the tube, is to place a quantity of resin within one end of the tube. Rollers are then manually applied to the exterior of the tube so as to urge the resin to flow along the tube and impregnate the layer. These methods of impregnating such tubes are relatively slow, require considerable manipulation, and do not evenly impregnate the tube with resin. The low speed and excessive manipulation increases the time and expense of impregnation, and the uneven impregnation results in a lining of uneven and, therefore, inferior quality.

Such tubes of the larger sizes are relatively difficult to handle manually due to their weight, especially when loaded with liquid resin. The prior art methods, therefore, are not well adapted to the impregnation of relatively long lengths of such tubing, especially when the tubing is several feet in diameter as is frequently required in the lining of sewers. Such large scale applications of lining passageways with a laminated, resin impregnated tube are highly advantageous, but are severely limited by the prior art.

PRIOR ART STATEMENT

Characterizing the closest art of which the Applicant is aware and in compliance with 37 CFR 1.97 and 1.98, attention is invited to the following patents which are relevant in relation to the impregnation of laminated tubes with a subsequently hardened material for lining passageways. Copies of these patents are attached as follows:

| Patent No. | Inventor | Date |
| --- | --- | --- |
| 4,009,063 | Wood | Feb. 22, 1977 |
| 4,064,211 | Wood | Dec. 20, 1977 |

OBJECTS AND SUMMARY OF THE INVENTION

Therefore, it is an object of the present invention to provide an improved apparatus for impregnating an absorbent tube with a flowable material.

Another object is to provide such apparatus which are portable and can be utilized to impregnate tubes where impregnated tubes are needed at a job site.

Another object is to provide such apparatus which uniformly and rapidly impregnate such tubes even of relatively large dimensions.

Another object is to provide such apparatus which minimize manual operations during such impregnation.

Another object is to provide such apparatus in which the tube is gently handled and uniformly stressed while being rapidly and uniformly impregnated.

Still further objects and advantages are to provide such apparatus for impregnating a tube which are dependable, economical, and fully effective in accomplishing its intended purpose.

BRIEF DESCRIPTION OF THE DRAWINGS

FIG. 1 is a side elevation of an apparatus embodying the principles of the present invention being utilized to impregnate a tube according to the method of the present invention, the apparatus being depicted at the site of a passageway which is being lined by eversion of the tube after such impregnation with a subsequently hardened material.

FIG. 2 is a plan view of the apparatus and operational environment of FIG. 1.

FIG. 3 is an end elevation at an enlarged scale of the apparatus taken on line 3—3 of FIG. 1.

FIG. 4 is a vertical section at an enlarged side taken on line 4—4 of FIG. 2.

FIG. 5 is a vertical section at an enlarged scale taken on line 5—5 of FIG. 4 showing a flattener utilized with the apparatus.

FIG. 7 is a fragmentary sectional view of the flattener of FIG. 5 showing the material being placed in the tube.

DESCRIPTION OF THE PREFERRED EMBODIMENT

Figure 6:
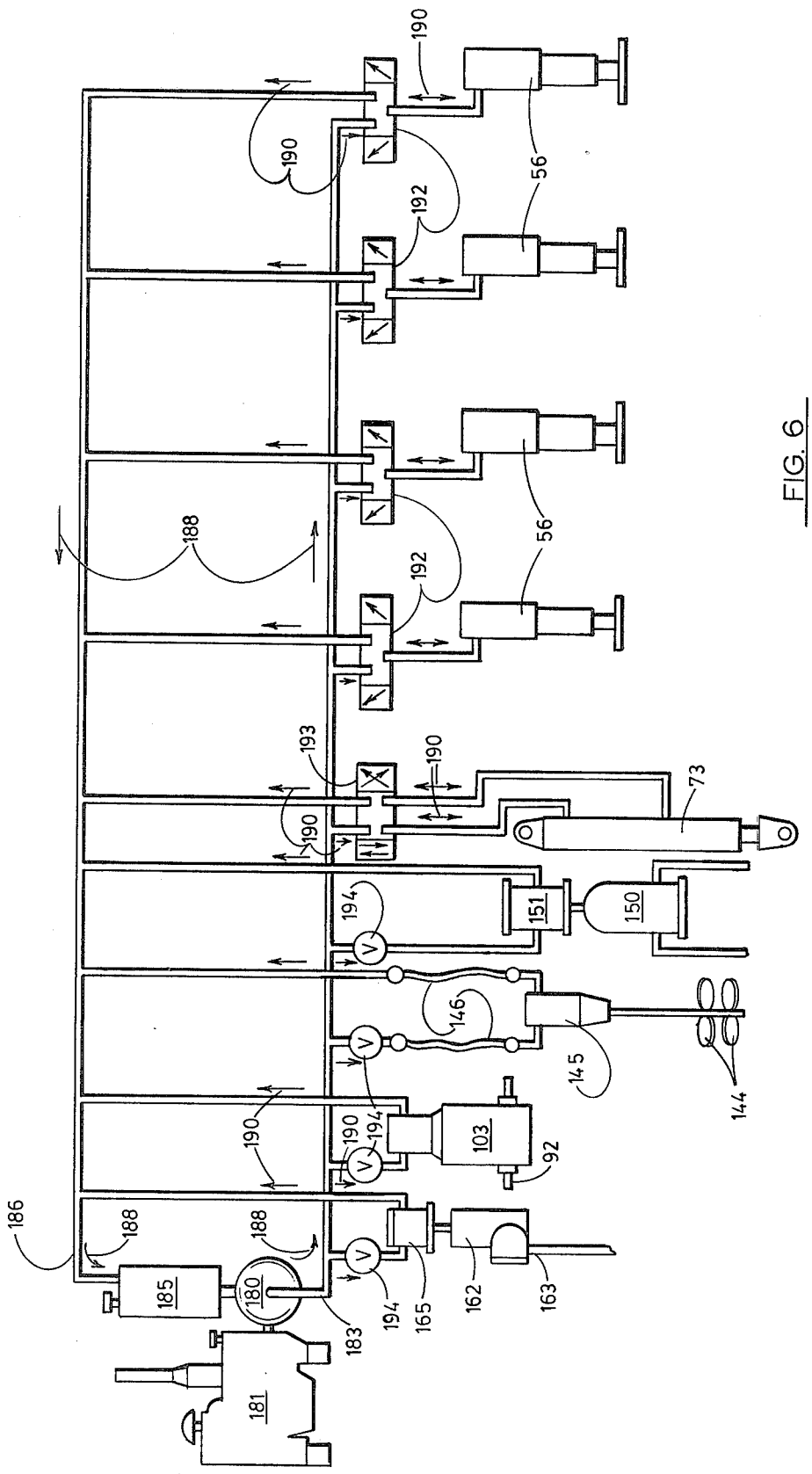
FIG. 6 is a diagrammatic view of an hydraulic system utilized with the apparatus.

Referring with greater particularity to the drawings, the apparatus of the present invention, indicated generally by the numeral 10, is shown in an operating environment in FIGS. 1 and 2 in which the method of the present invention is utilized.

The apparatus is shown supported on the earth surface below which is a horizontal cylindrical passageway 15, typically a sewer. The passageway has a manhole or opening 16 extending upwardly therefrom to the earth surface. The passageway is being lined with a tube 20 by a method disclosed in detail in U.S. Pat. No. 4,064,211 to Wood and referred to in the Prior Art Statement above. The tube has a predetermined leading end 21 and an opposite end 22. The tube, as it is supplied to the apparatus 10 and as it passes therethrough, has an outer lamina 23 of impervious material such as polyethylene or polyvinyl chloride plastic. The tube has an inner porous or absorbent lamina 24 of a material which is either felt or woven. The inner lamina is impregnated, in a manner subsequently to be described, by the apparatus with a flowable material, such as a synthetic resin, which subsequently hardens in the passageway.

The passageway 15 is lined by inserting an L-shaped pipe 30 into the opening 16. The pipe has an open vertically disposed upper end 31 and an opposite open horizontally disposed lower end 32. The pipe is disposed with its lower end within the passageway and directed toward the portion of the passageway to be lined. The upper end of the pipe is disposed substantially above the earth surface. The lower end is somewhat smaller in diameter than the passageway. The tube 20 extends through the pipe and is folded back upon itself so that its leading end is fitted in circumscribing relation to the lower end of the pipe. The leading end of the tube is sealed to the lower end of the pipe by a ringshaped clamp 34. The pipe is filled with a quantity of water 35, as indicated at 36, from any suitable source, not shown. The water runs into the portion 38 of the tube within the passageway where its weight causes the tube to evert and to move along the passageway away from the pipe. As the tube everts and fills the passageway, the resin impregnated absorbent lamina 24 is outwardly disposed and the impervious lamina is exposed to the water 35. This water inflates the impervious lamina forcing the absorbent porous lamina outwardly into a tubular configuration for lining the passageway. When the resin hardens, the hardened resin and the material forming the absorbent lamina form a rigid protective lining for the passageway.

When the apparatus 10 is in use, it is disposed between the opening 16 and a skip or large metal box 40 containing a supply of tube 20 of absorbent material. The tube is supplied in a continuous length which is folded into the skip in stacked layers. The tube is folded so that the leading end 21 is at the top of the skip and the opposite end 22 is at the bottom of the skip. The skip is provided with a roller 41 on the upper edge thereof which is disposed toward the apparatus. The axis of the roller extends transversely of the tube. The skip is provided with an opening 42 toward its bottom for access to said opposite end of the tube.

The apparatus 10 includes a truck trailer 50 of any suitable construction. The trailer is provided with wheels 51 and a towing hitch 52 for transporting the trailer to an opening 16 at which the apparatus is to be used. The trailer has an elongated, rectangular planar bed 55 extending longitudinally along the direction of movement of the trailer. Each corner of the bed is provided with a leveling jack 56. The jack can be extended downwardly from the bed to engage the earth surface or contracted upwardly when the apparatus is to be moved. The bed has a predetermined discharge longitudinal end 58 which is disposed toward and adjacent to the opening when the apparatus is in use and has an opposite receiving end 59. The hitch 52 extends longitudinally from the receiving end. A skip 40 with a supply of tube 20 is disposed adjacent to the receiving end with the axis of the roller 41 extending substantially parallel to the receiving end.

The apparatus 10 has an elongated, rectangular frame 65 mounted on the bed 55. The frame is substantially aligned longitudinally with the bed. As best shown in FIGS. 2 and 3, the transverse dimension of the frame is approximately one-half that of the bed and the frame is mounted between the longitudinal center line of the bed and one of its longitudinal edges. Longitudinally, the frame is substantially shorter than the bed and is disposed centrally thereon. The frame has three pairs 67 of longitudinally extending, parallel bars. The bars of each pair extend along the transversely opposite sides of the frame for its full length. The pairs of bars are disposed in vertically superimposed or stacked relation. Vertically, the lower pair of bars is spaced somewhat above the bed, and the central pair is spaced approximately equally from the upper and from the lower pair. The frame has a discharge end and a longitudinally opposite receiving end, respectively, corresponding to the discharge end 58 and the receiving end 59 of the bed.

A planar, trapezoidal discharge slide 70, best shown in FIGS. 1 and 2, is pivotally mounted at one of its parallel edges on the discharge end of the frame 65. This edge extends between the upper pair 67 of bars. The slide extends longitudinally from this edge to an opposite distal edge 71. This edge is spaced from the frame a distance substantially greater than the distance from the frame to the discharge end 58 of the bed 55. The width of the distal edge is approximately equal to the diameter of the upper end 31 of the pipe 30. An hydraulic ram 73 extends from said end of the bed to the underside of the slide adjacent to its distal end. The opposite ends of the ram are pivotally connected to the slide so that the slide is pivoted upwardly and downwardly, respectively, by extension and contraction of the ram.

An elongated, rectangular receiving slide 75 is mounted on the bed 55 above its receiving end 59. This slide has opposite ends 76 and is substantially as wide as the frame 65. This slide is mounted substantially as a longitudinal extension of the lower pair 67 of bars of the frame. One of the ends of this slide is juxtapositioned to the ends of said bars, and the slide extends from said end substantially beyond the hitch 52.

This apparatus has a conveyor indicated generally by the numeral 80 in FIG. 1. The conveyor includes three reaches or runs 82 individually corresponding to the pairs 67 of bars. Each reach has four cylindrical, axially elongated pulleys 84, best shown in FIG. 4, mounted on the corresponding bars. The pulleys are mounted for rotation about axes extending transversely between the bars, and the length of the pulleys is substantially equal to the distance between the bars. Two pulleys of each reach are disposed individually at the discharge end of the frame and at the receiving end of the frame. The remaining two pulleys are disposed substantially at the center of the bar and adjacent to each other. Each reach has two endless flat belts 86. Each belt is extended about one of the end pulleys and about the central pulley nearest to said one end pulley, defining an upper run 87 and a lower run for each belt. The belt is frictionally engaged with its respective pulleys.

The conveyor 80 includes a drive mechanism 90, best shown in FIGS. 3 and 4, mounted on the frame 65 and supported thereon by brackets 91. The mechanism is disposed adjacent to the longitudinal center of the frame on the side thereof opposite to the longitudinal center line of the bed 55. The mechanism has three substantially identical drive shafts 92 individually corresponding to the reaches 82. Each shaft is mounted for rotation about an axis extending parallel to the pulleys 84. The shaft extends between and above the central, adjacent pair of pulleys of its respective reach. Each shaft has an inner end portion 93 disposed somewhat within the frame and an outer end portion 94 extending outwardly from the frame. The inner portion of the shaft has a pair of axially adjacent pulley driving sprockets 96 mounted thereon, and a shaft drive sprocket 97 is mounted on the outer portion of the shaft. These sprockets are mounted for rotation with the shaft. The drive sprockets of the three shafts are axially aligned. Each pulley 84 of the centrally adjacent pairs thereof has a driven sprocket 99 mounted thereon for rotation therewith. The two drive sprockets of each of said pairs of pulleys are individually axially aligned with the driving sprockets of the corresponding drive shaft. A chain 101 is extended about each aligned pair of sprockets 96 and 99 in driving relation so that the pulleys are rotationally driven in the same direction as their respective drive shafts.

The drive mechanism includes an hydraulic motor assembly 103. The upper of the drive shafts 92 extends through the assembly and is driven directly therefrom. The inner end portion 93 and the outer end portion 94 of this shaft thus extend oppositely from the assembly. The drive mechanism includes a pair of idler sprockets 105 mounted adjacent to the centrally disposed drive shaft on opposite sides thereof. The sprockets are mounted for rotation about individual axes extending substantially parallel to said shaft at substantially the same elevation. A shaft drive chain 107, best shown in FIG. 4, is extended in driving relation about the shaft drive sprockets 97 and the idler sprockets. This chain extends successively downwardly from the upper drive sprocket at the side thereof disposed toward the discharge end of the frame, about the correspondingly disposed idler sprocket, about the lower portion of the lower drive sprocket, and then upwardly about the correspondingly disposed side and upper portion of the center drive sprocket. The chain then extends about the lower portion of the other idler sprocket and returns to the upper drive sprocket.

The motor assembly 103 is adapted rotationally to drive the upper of the drive shafts 92 in a predetermined direction, counterclockwise as indicated by the arrow 110 in FIG. 4. As a result, the chain 107 is driven in the direction indicated by the arrows 111. The manner in which the chain is extended about the lower drive sprockets 97 causes them to be rotated in opposite directions. The lower drive shaft thus rotates in the same direction as the upper drive shaft, as indicated by the arrow 112, while the center drive shaft rotates oppositely as shown by the arrow 113. Since the pulleys 84 rotate in the same direction as the respective drive shafts, the upper runs 87 of the belts are driven in the directions indicated by the arrows 114. The upper runs of the upper and the lower of the reaches 82 of the conveyor 80 thus move in a direction from the receiving end 59 of the bed 55 toward the discharge end 58 thereof. The upper runs of the central reach move in the opposite direction, from the discharge end toward the receiving end.

The apparatus 10 includes a tube flattener 120, best shown in FIGS. 4 and 5, mounted adjacent to the discharge end of the frame 65 above the upper of the reaches 82 of the conveyor 80. The flattener has an auxiliary frame 122 having a pair of inclined rails 123, individually mounted on the pair 67 of bars of the upper reach. One end of each rail is connected to a point on the top of its respective bar adjacent to the pulley 84 at the discharge end of said reach. Each rail extends upwardly from its respective bar and oppositely of said pulley to an end individually connected to said bar by a vertical brace 124. The length of the rail is approximately one-seventh of the length of the frame. The flattener has a first roller 126 mounted on and extending between the rails. The roller is mounted for rotation about an axis extending substantially parallel to the upper run 87 of the belt 86 which is disposed toward the discharge end of the upper reach. The first roller is mounted at the end of the rails disposed toward said discharge end at a predetermined distance from said upper run. This distance is substantially equal to the thickness of the tube 20 when it is in a substantially flattened condition against said upper run. This upper run and the first roller define a throat therebetween extending transversely of the frame 65. The flattener has a plurality of secondary rollers mounted on the rails 123 for rotation about individual axes extending parallel to the axis of the first roller. The first roller and the secondary rollers are substantially equally spaced along the inclined rails 123 so that the secondary rollers are disposed in successively spaced relation from the first roller and the throat.

The apparatus 10 has a resin supply system indicated generally by the numeral 135 and best shown in FIGS. 1, 2 and 3. The system is generally disposed on the portion of the bed 55 not occupied by the frame 65 and the elements associated therewith. The resin 136 is conventionally supplied in a liquid, unhardened state in drums 137. Each drum is provided with a pair of openings 138 in the top thereof. Any suitable number of the drums can be rested on said portion of the bed in any convenient arrangement. A jib crane 140 is mounted on the corner of the bed at the discharge end 58 thereof and opposite of the frame. The crane is utilized for lifting filled drums from the earth surface or from a truck, not shown, onto the bed.

The resin system 135 includes a well-known form of barrel mixer 142 which can be mounted on a drum 137 for mixing the resin 136 therein. The mixer has a clamp 143 adapted to engage the drum and a shaft for insertion through one of the openings 138 in the drum. The shaft is provided with mixing paddles 144. The shaft is rotationally driven by an hydraulic motor 145 which is connected by flexible hoses 146 to an hydraulic system subsequently to be described. The resin system includes a well-known resin pump 150 having an inlet and an outlet and mounted on the bed 55 adjacent to the tube flattener 120. The pump is driven by an hydraulic motor 151. The pump inlet is connected to one end of an inlet hose 153. The opposite end of this hose is adapted for insertion into a drum through the opening therein not occupied by the mixer. The resin system includes a resin insertion hose 155, having one end connected to the outlet of the pump and an opposite end 156. The pump can thus draw resin from a drum 137 and discharge it through said opposite end of the insertion hose. The length of the insertion hose is such that said opposite end can be extended to a position adjacent to the tube flattener and opposite the discharge end of the frame therefrom.

The apparatus 10 includes a vacuum system 160, best shown in FIGS. 1 and 4, mounted on the underside of the bed 55 at the receiving end 59 thereof. The vacuum system includes a vacuum pump 162 having a vacuum connection 163. The pump is driven by an hydraulic motor 165. This system includes a tank 167 which has a pair of connections 168. One of these connections communicates with the vacuum connection of the pump. The other connection of the tank is connected to one end of a hose 170 having an opposite end 172. The length of the hose is such that said opposite end can be extended through the opening 42 into the skip 40.

The apparatus 10 is provided with an hydraulic system, best shown in FIGS. 1 and 6, constructed of well-known elements. The system has a pump 180 disposed at the receiving end 59 of the bed 55 and transversely of the receiving slide 75. The pump is directly driven by an internal combustion engine 181 and supplies hydraulic fluid under pressure to a supply manifold 183. The pump receives hydraulic fluid from a reservoir 185. The fluid returns to the reservoir through a return manifold 186. The direction of fluid flow in these elements is indicated by the arrows 188. The hydraulically actuated elements of the apparatus 10 are connected to the manifolds by suitable conduits in which fluid flows as indicated by the arrows 190. Each of the leveling jacks 56 is provided with a three-way valve 192 to control its extension and contraction. The ram 73 is provided with a four-way valve 193 to control its extension and contraction. The hydraulic motor assembly 103 and the motors 145, 151 and 165, respectively, of the conveyor drive mechanism 90, the barrel mixer 142, the resin pump 150, and the vacuum pump 162 are provided with individual speed control valves 194. These control valves are of any suitable type and are schematically represented.

OPERATION

The operation of the described embodiment of the present invention is believed to be clearly apparent and is briefly summarized at this point. The apparatus 10 is first transported to the site of an opening 16 in a passageway 15 to be lined with the tube 20. The trailer 50 is then positioned in relation to the opening, as shown in FIGS. 1 and 2 with the frame 65 longitudinally aligned with the opening. The engine 181 is then started to power the hydraulic elements of the apparatus. The bed 55 of the apparatus is leveled with the jacks 56.

The discharge slide 70 is elevated with the ram 73, and the L-shaped pipe 30 is inserted through the opening into the passageway. This slide is then positioned so its distal edge 71 is substantially centered above and adjacent to the upper end 31 of the pipe. One or more drums 137 of resin 136 are then placed on the bed. A drum is opened and the barrel mixer 142 is mounted on the drum with the paddles 144 inserted therein through one of the openings 138. The motor 145 is then energized to mix the resin. The inlet hose 153 connected to the resin pump 150 is inserted into the drum through the other opening 138 to supply resin to the pump.

When the trailer 50 is properly positioned in relation to the opening 16, a skip 40 containing a supply of the tube 20 is positioned at the receiving end 59 of the bed 55 longitudinally aligned with the frame 65. The receiving slide 75 is then mounted between the frame and the skip. When the skip 40 is positioned, the vacuum hose 170 is extended and the end 172 thereof inserted through the opening 42 in the skip. This end is then connected in air tight relation to the tube 20 at its end 22 disposed at the bottom of the skip.

the leading end 21 of the tube 20 is drawn manually from the top of the skip 40 over the roller 41 along the receiving slide 75 and along the lower of the reaches 82 toward the discharge end of the frame. The leading end is drawn to a point along the lower reach such that when the tube is rested thereon, it is sufficiently engaged by the reach that movement thereof will continue to draw the tube from the skip.

The motor 103 of the conveyor drive mechanism 90 is now energized motivating the upper runs 87 of the belts 86 to move in their respective directions, as indicated by the arrows 114. As the belts move, the tube 20 is moved along the lower of the reaches 82 until the leading end 21 reaches the discharge end of the frame. The leading end is then manually fed upwardly and in a reverse direction for engagement by the center reach. The tube is carried along the center reach until the leading end thereof reaches the receiving end of the frame. The leading end is again fed upwardly and reversely to the upper reach. The weight and flexibility of the tube are such that it curves upwardly from the two lower reaches at the respective ends thereof where the tube is fed to the reach immediately above. The leading end is transported along the upper reach until it reaches the tube flattener 120. The conveyor is then stopped. Additional movement of the conveyor will, of course, move the leading end through the throat 128 and from the conveyor at the discharge end of the frame.

The tube 20 is thus transported with the leading end 21 first through the conveyor 80 in a path, best shown in FIG. 1, from the receiving end of the frame 65 to the discharge end thereof. The direction of movement of the tube is reversed twice along the path at the points where the tube is fed from each two lower reaches 82 to the next higher reach. As a result, the tube is transported along the path in a zig-zag configuration. As the tube moves along the path, it is supported successively by the upper runs 87 of the belts 86 except at the ends of the two lower conveyors where the tube is being fed upwardly and reversely.

Before the leading end 21 of the tube 20 is transported along the above described path through the throat 128 of the tube flattener 120, a substantial quantity of the resin 136 is inserted in the leading end 21 of the tube, as shown in FIG. 7. The leading end of the tube is upwardly disposed in juxtapositioned relation to the tube flattener at the one of the second rollers 130 opposite the first roller 126. The resin insertion hose 155 is extended to upper reach, and the end 156 of the hose is disposed adjacent to the leading end 21 of the tube. The motor 151 of the resin pump 150 is then energized to pump a quantity of resin, as indicated by the numeral 197, from a drum 137 into the tube within the absorbent inner lamina 24. A sufficient quantity of the resin is inserted into the tube to impregnate the entire length thereof required to line a desired length of the passageway 15 in one operation. When the desired quantity of resin is inserted, the pump motor is de-energized, and the insertion hose is removed from the tube. The leading end of the tube is lowered onto adjacent upper run 87. The conveyor motor is energized to transport this end of the tube through the flattener so that the tube is oppositely engaged in the throat 128 between the belt and the first roller.

The quantity of resin 136 in the tube 20 forms a bulge 200 adjacent to the flattener 120, as shown in FIG. 4. As the tube moves through the flattener, the secondary rollers 130 and then the first roller 126 successively urge the bulge against the upper run 87 at the discharge end of the upper reach 82.

As the tube passes through the throat 128, it is flattened therein and the resin in the bulge 200 is spread transversely of the frame 65 from side to side within the tube. As the conveyor 80 transports the tube through the apparatus 10, the tube passes through the flattener commencing at the leading end so that the resin is extruded along the tube toward said opposite end. When the tube is engaged in the throat, the motor 165 driving the vacuum pump 162 is energized, creating a negative pressure in the reservoir 167, the hose 170, and the end 22 of the tube opposite the leading end. The impervious outer lamina 23 minimizes intrusion of air into the tube 20 so that an effective vacuum can be maintained. The negative pressure urges the fluid resin to flow within the tube toward said opposite end. The combined action of the flattener 120 and the vacuum system 160 thus cause the resin thoroughly to impregnate the absorbent lamina 24 of the length of the tube required to line the passageway 15.

The weight and viscosity of the resin 136 are such that the tube 20 cannot be drawn conveniently from the skip 40 if the resin impregnates the tube while in its folded condition in the skip. Therefore, the length of the conveyor is such that all impregnation of the tube occurs on the conveyor. Although the resin flows, as described, within the tube toward the end 22 thereof in the bottom of the skip, the tube moves through the apparatus 10 at a rate such that the resin does not flow within the tube beyond the lower of the reaches 82. The portion of the tube within which the resin is extruded thus extends from the throat 128 to a point along the conveyor, indicated approximately by the arrow 201, such that the combined length of the reaches 82 of the conveyor is greater than said portion of the tube.

After the leading end 21 of the tube 20 passes through the flattener 120, this end is fed over the discharge slide 70 and through the L-shaped pipe 30. The leading end is then clamped to the pipe and inflated as previously described so as to line the passageway 15.

If the length of the tube 20 supplied in a skip 40 is insufficient to completely line a passageway 15, the leading end 21 of the tube from another skip can be sewn to the end 22 of a first tube allowing a passageway of any length to be lined. If there is insufficient resin 136 in a drum 137 to impregnate the length of tube required to line a passageway, the inlet hose 153 can, of course, be transferred to another drum containing additional resin.

The apparatus 10 of the present invention is thus utilized to impregnate a length of laminated tube 20 for lining a desired passageway 15 with resin 136 which subsequently hardens. The impregnation occurs at the site of the passageway so that the tube need not be refrigerated before being brought to the site. The tube does not have to be handled manually once it is fed through the apparatus, so that a passageway of relatively large size can be lined rapidly and conveniently.

Although the invention has been shown and described in what is conceived to be the most practical and preferred aparatus, it is recognized that departures may be made therefrom within the scope of the invention, which is not to be limited to the illustrative details disclosed.

Having described our invention, what we claim as new and desire to secure by Letters Patent is:

1. A vehicle mounted apparatus for impregnating with a subsequently hardened fluid material an evertible tube taken from a supply thereof for lining a passageway through an opening therein; the tube having opposite ends, a fluid impermeable outer lamina, and an absorbent inner lamina which is impregnated with the material, the apparatus comprising
  A. an elongated frame adjacent to the supply having a discharge end disposed toward the opening;
  B. a conveyor mounted on the frame having a plurality of substantially horizontal, longitudinally extending, elevationally spaced, planar reaches;
  C. a transversely extending first roller mounted on the frame at the discharge end thereof and spaced from one of the reaches a distance corresponding to the thickness of the tube in a substantially flattened condition to form a throat between the roller and said reach;
  D. a plurality of secondary rollers mounted on the frame extending substantially parallel to the first roller oppositely of the discharge end in successively spaced relation from said reach and the discharge end;
  E. powered means for driving adjacent reaches in opposite directions with said throat defining reach moving toward the discharge end of the frame for transporting the tube endwardly along a zig-zag path extending toward and through the throat so that the rollers flatten the tube; and
  F. means disposed adjacent to the secondary rollers oppositely from the first roller for inserting a quantity of the material within the leading end of the tube prior to passage thereof through the throat so that such passage urges the material to flow from side to side within the tube and to be extruded along the tube away from said leading end thoroughly to impregnate the absorbent lamina.

2. The apparatus of claim 1 having a source of vacuum connected to the end of the tube opposite said leading end thereof, whereby the fluid material is urged to flow within the tube toward said end thereof opposite to the leading end.

3. An apparatus for impregnating a flexible tube with a subsequently hardened material comprising:
  A. a said tube having a supply of said material within one end thereof;
  B. driven conveyor means comprising a plurality of horizontal reaches whereby said tube is fed along a zig-zag path;
  C. vacuum means communicating with the other end of said tube; and
  D. means for progressively flattening said tube to effect said impregnating by spreading said material transversely and axially throughout said tube; and
  E. said flattening means comprising a plurality of spaced roll elements operatively associated with the discharge end of said conveyor and progressively spaced therefrom.

4. The apparatus of claim 3 wherein said conveyor means comprises a series of endless belts.

* * * * *